Aug. 2, 1938.　　　　A. A. LIEBELT　　　　2,125,859
SCRAPER
Filed Oct. 19, 1936　　　　2 Sheets-Sheet 1

INVENTOR.
Adolph R. Liebelt
BY Murray & Zagelter
ATTORNEYS

Aug. 2, 1938.   A. A. LIEBELT   2,125,859
SCRAPER
Filed Oct. 19, 1936   2 Sheets-Sheet 2
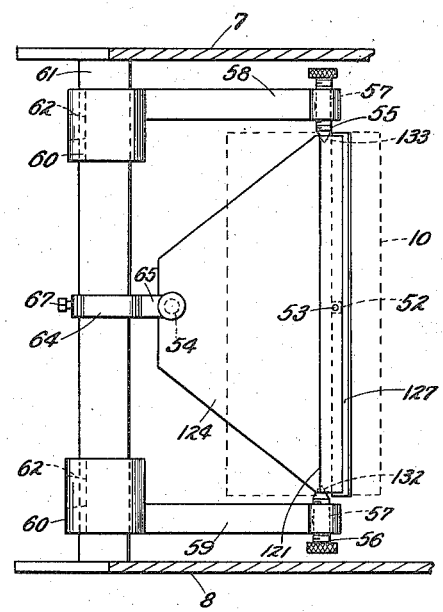
Fig. 4.
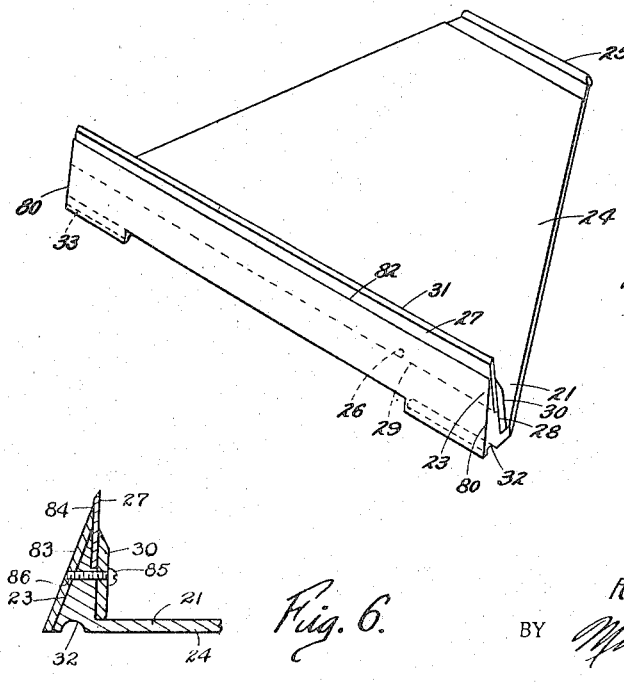
Fig. 5.
Fig. 6.
INVENTOR.
Adolph A. Liebelt
BY
ATTORNEYS Patented Aug. 2, 1938

2,125,859

UNITED STATES PATENT OFFICE 2,125,859

SCRAPER

Adolph A. Liebelt, Cincinnati, Ohio, assignor to The J. H. Day Company, Cincinnati, Ohio, a corporation of Ohio Application October 19, 1936, Serial No. 106,309

15 Claims. (Cl. 107—12)

This invention relates to a scraper for rotating rolls which are to be kept clean and free of adhering material.

An object of the invention is to provide a roll scraper which is so constructed and arranged as to perform a better and more complete continuous function of scraping than other devices heretofore provided for the purpose.

Another object of the invention is to provide a scraper structure which admits of quick and easy adjustment and replacement when necessary, with a considerable saving of time, labor, and expense.

Another object of the invention is to provide a scraper which will maintain its adjustment for long periods of time without gradual impairment of its scraping function, and which may be quickly adjusted, when necessary, without dismantling and shutting down the machine upon which it is installed.

A further object of the invention is to provide a scraper structure which is simple, durable, and inexpensive, though possessing many advantages over known scraper structures heretofore used.

The foregoing and other objects are attained by the means described herein and disclosed in the accompanying drawings, in which:

Fig. 4 is a cross-sectional view taken on line 4—4 of Fig. 1.

Fig. 5 is a detailed perspective view of the scraper structure of the invention.

Fig. 6 is a cross-sectional view showing a modification.

Figure 1:
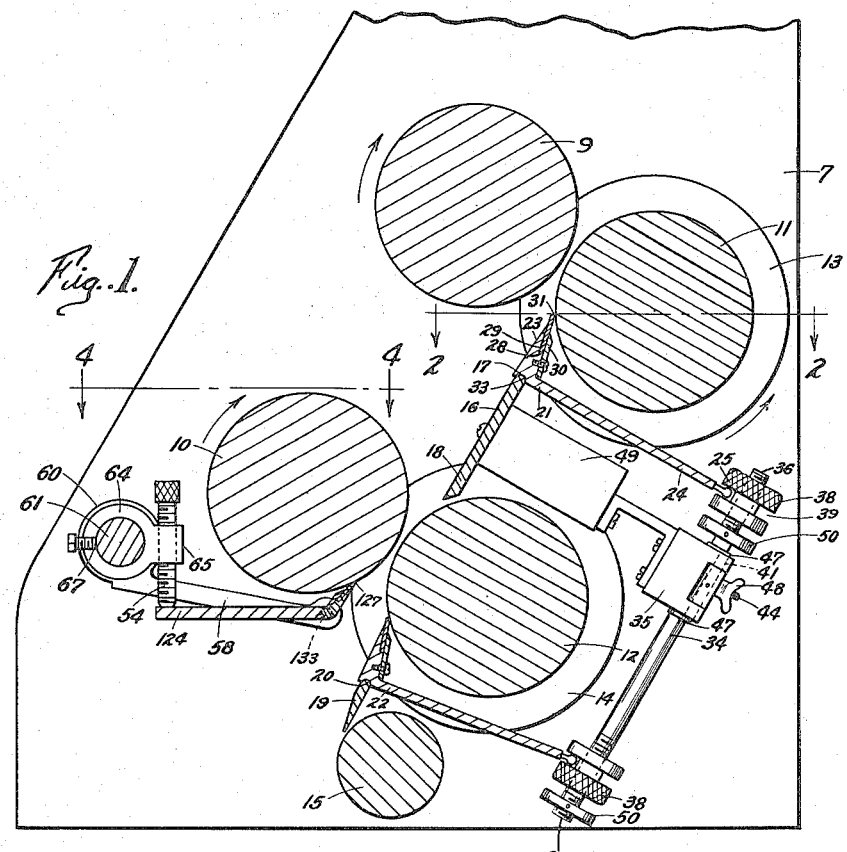
Fig. 1 is a cross-sectional view of a sheeting device or roll assembly provided with scraper structures embodying the invention.
Figure 2:
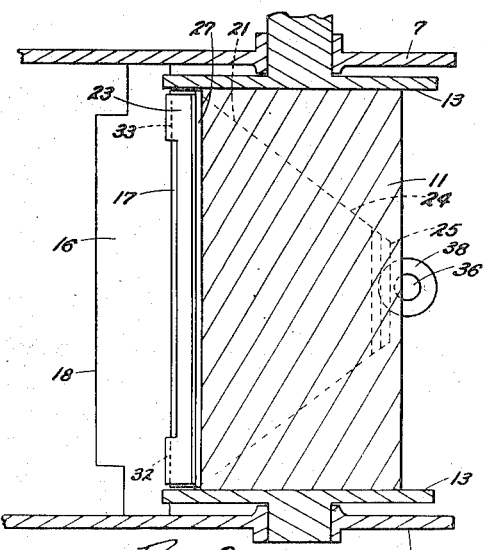
Fig. 2 is a fragmental cross-sectional view taken on line 2—2 of Fig. 1.

The several advantages of the present invention as above related, result from a novel construction of scraper and its relationship to a roll operated upon. Briefly stated, the scraper includes a saddle or blade holder which is characterized by a three point suspension or support therefor, and so arranged as to have a rocking or pivoting action upon a steady rest or mount located near the roll in parallelism therewith. Two of the three suspension points function to position a blade against the roll in such a manner as to maintain the blade always in parallelism with the roll axis, while the third suspension point is adjustable as to height for the purpose of adjusting the blade edge toward and from the roll surface. The blade is loosely accommodated by the saddle or holder so that it may be considered a floating blade, which will automatically center itself between the flanges of a flanged roll with a minimum of clearance, thereby to insure at all times a clean condition of the roll at the juncture of its flanges with the intermediate curved working surface thereof. The three point suspension referred to likewise insures a self-centering of the saddle between the roll flanges. The scraper structure, with slight modification, may be applied also to a plain or flangeless roll, as will be explained.

The three point suspension and floating blade arrangement, together with the particular rocking feature of the saddle as mentioned, makes for easy adjustment, and, when necessary, a quick replacement of a worn or damaged blade. Of equal importance is the fact that the structure insures, in all adjusted positions of the blade, a proper engagement of the knife edge of the blade upon the roll surface, without contact of any heel that might form on the blade incidentally to its wearing away due to long or severe usage.

With reference now to the accompanying drawings, the characters 7 and 8 indicate the opposed spaced side members of a roll supporting frame which may be part of a machine for sheeting or working plastic substances such as dough and the like. A series of rolls 9, 10, 11, and 12 are mounted for rotational movement between the frame side members, the rolls 9 and 10 being shown as flangeless or plain rolls, whereas the rolls 11 and 12 are provided with flanges 13 and 14 at their opposite ends. The additional roll indicated at 15 is one element of a curling mechanism for rolling into loaf form a succession of sheets produced by the flanged and plain rolls mentioned. Below and to one side of the axis of roll 11 is a transverse fixed member 16 known as a steady rest for the blade holder, and which has an upper rounded edge 17 accurately finished and located in spaced parallelism with the axis of roll 11. Member 16 extends downwardly toward and into close proximity with the working face of roll 12 as indicated at 18, so as to provide a guide for material fed in sheet form from the rolls 9—11 to the rolls 10—12. A similar steady rest or blade holder support 19 is provided between the rolls 12 and 15, and it likewise has an upper rounded edge 20 accurately located in spaced parallelism with the axis of roll 12.

The rounded upper edges 17 and 20 serve as fulcrums for a rockable scraper blade holder or saddle associated with each steady rest, these holders or saddles being indicated generally by the characters 21 and 22. As the holders or saddles 21 and 22 are identical, a description of one will suffice for the other also.

The saddle 21, as most clearly shown in Fig. 5, comprises an elongated forward blade socket or channel member 23 of such length as to fit with reasonable accuracy and clearance, between the opposed flanges 13 of a roll. The socket or channel member is disposed in upstanding relationship, preferably at substantially a right angle, to an extensive rearwardly directed wing or lever 24 of a length considerably in excess of the height of the socket or channel member 23. At its free end, the wing or lever 24 is provided with a bead or bearing 25 adapted to cooperate with a means to be described, for rotating the holder or saddle upon its fulcrum point 17. The blade socket or channel member 23 may be constructed in any suitable manner, so long as it furnishes a channel 26 to receive a blade 27 in such manner that the blade may at all times be free to move lengthwise therein. The length of the blade is to be such that it fits very closely between the flanges of the roll 11, preferably with a clearance as little as one-thousandth of an inch or less. The clearance provided for the channel member 23, between the roll flanges preferably is slightly greater, so that no binding of the channel member upon the flanges is apt to occur while the edges 80—80 perform to scrape that portion of each flange which is not within the reach of the blade ends. It may here be stated that a satisfactory construction of the channel member results from providing a step or abutment 28 upon the inner face of member 23 to support the lower edge 29 of the blade, while a removable plate 30 furnishes the necessary support for that side of the blade which is nearest the roll surface. The upper knife edge 31 of the blade extends a fraction of an inch above the members 23 and 30, so as to be in proper position for scraping the working surface of the roll without interference by the parts which support the blade. The member 23 has a feather-edge 82 meeting the blade at a slight angle so as to avoid the formation of any shoulder likely to obstruct or divert the dough in its travel toward the curling roll 15. As before stated, the blade may be lifted bodily from the channel member 26 without the use of tools, and it may also have free longitudinal shiftability relative thereto.

Directly beneath the blade 27, and close to the plane thereof, the saddle 21 is provided with a pair of spaced bearings 32 and 33 which provide two opposed points of suspension for the saddle or holder upon the fulcrum 17. These bearings are accurately located so that the knife edge of the blade will be parallel to the axis of roll 11. The knife edge of the blade is to be adjusted toward and from the roll axis by elevating or lowering the wing or lever 24, and fixing it in adjusted positions by the use of any suitable means. The adjusting means herein disclosed operates in a satisfactory manner, and it comprises a rod or shaft 34 supported by a suitable bearing or mounting means 35 so that the axis of the shaft or rod is substantially parallel to a plane which includes the axes of rolls 11 and 12. The adjusting rod or shaft preferably is screw threaded at its upper and lower ends, as indicated at 36 and 37, to receive the annularly grooved adjusting nuts 38 which may be rotated to adjusted positions along the threads of the adjusting rod or shaft. The width of the annular groove 39, of the nut is such as to snugly receive the rounded bead 25 of the wing or lever 24. This provides the third point of suspension for the saddle or blade holder. The adjusting nuts may be knurled or otherwise fashioned to provide a finger grip whereby the adjustment may be effected.

Figure 3:
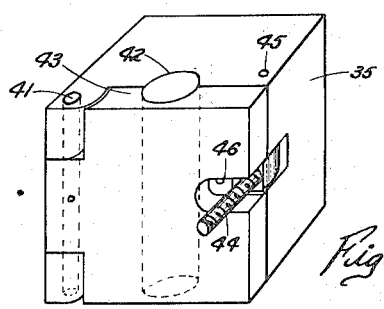
Fig. 3 is an enlarged perspective view of a quick-release holder or bearing which forms a detail of the structure.

By preference, the adjusting rod with its associated adjusting nuts, is so supported by the bearing or mounting means 35 as to be bodily displaceable therefrom when it is considered necessary or desirable to bodily remove the saddles or blade holders from their operative positions shown in Fig. 1. To effect a quick and easy bodily removal as stated, the bearing or mounting means 35 is made in the form of a rod clamp which is detailed in Fig. 3, and which comprises a stationary bearing block portion 42 and a movable complementary bearing portion 43. The movable bearing portion may be hinged as at 41 for swinging movement from the stationary bearing portion for bodily releasing the adjusting screw or rod 34 which is normally embraced by the blocks or portions 42 and 43. The movable bearing portion 43 may be normally held in abutment with the stationary portion 42, by means of a screw threaded member 44 that may be swung outwardly about a pivot 45, or inwardly to rest within a slot 46, and in the latter position the member 44 may have a nut applied thereto to abut the movable bearing portion 43 in the region of the slot 46. A wing nut or thumb nut 48 is appropriate for use upon the threaded member 44 for the purpose just stated. In order that the adjusting screw or rod 34 may assume the same relationship to the quick detachable support 35 upon each replacement, the adjusting screw or shaft may be provided with a pair of spaced shoulders or locating means 47 adapted to abut the upper and lower extremities of the bearing or mounting means 35. It will be noted that the bearing or mounting means is fixed in relation to the machine frame and to the transverse brace or support 49, which carries the steady rest 16.

As a means of determining whether or not a blade requires replacement due to its wearing away after prolonged or severe usage, there may be provided a stop such as 50 fixed upon the adjusting screw 34 at a proper distance from the adjusting nut 38, so that when the nut reaches the stop, that fact will indicate the need for blade replacement.

At this point, it is important to note that the scraper blade is not adjusted tangentially to the working surface of the roll, but rather inwardly toward the axis thereof. The result of this construction is that successive adjustments of the blade toward the roll as the blade wears, will not cause the heel of the blade edge to contact the working face of the roll. In other words, the sharpened knife edge of the blade is the only portion thereof that contacts the roll when the blade is adjusted for wear. By reason of this manner of adjustment, any heel that may develop on the scraper blade will not contact the roll and hold the keen edge of the blade away from the roll and objectionably permit dough or other sheeted material to force itself past the scraper and remain on the roll. The construction eliminates entirely the heretofore necessary removal of the scraper structure, and the filing off of the heel developed thereon. As the scraper blade used in the present construction is very thin, no appreciable heel can form thereon. Thus, the working surface of the roll is insured against accumulation of dough or plastic throughout the life of the scraper blade, and since the blade may float between the flanges of the roll, it may be fitted therebetween with very little clearance so that dough or plastic has no opportunity to accumulate at the meeting corners forming the junction of the flanges with the working surface of the roll.

To adjust the scraper of the present invention, no tools are needed, and the blade need not be removed or distorted to make it fit the roll, as in previous constructions. The single point of adjustment insures a perfectly parallel take-up for wear, so that the blade cannot assume a position other than that at which its entire scraping edge imposes a uniform force at all points of contact upon the roll.

By reason of the three point suspension of the scraper saddle or holder, both the forward end of the saddle and the opposite ends of the scraper blade automatically position themselves between the roll flanges, so that no excessive wearing can occur on one side of the scraper or roll flange, and moreover, there is no tendency for one end of the scraper to wear more than the other, so as to destroy or impair the effectiveness of scraping action at the corners of the roll. It has been impossible heretofore, to maintain the close scraper clearance that characterizes the present invention, and to maintain a proper scraper adjustment throughout the life of the scraper. The present scraper structure has the additional advantage that it can not be twisted and distorted during shipment of the machine upon which it is used. The fault just mentioned has been commonly observed in machines equipped with fixed scrapers.

In applying the invention to perform a scraping action upon a plain or flangeless roll as disclosed at 10 in Figs. 4 and 1, it is necessary to limit or eliminate entirely the free longitudinal shifting movement of the blade 127. This may be accomplished by notching the lower edge of the blade as at 52 for reception of a fixed stud, pin or abutment 53 carried by the blade holder and extended into the socket or channel that supports the blade. This alteration, of course, does not prevent quick bodily removal and replacement of the blade from its supporting channel. As disclosed in Fig. 4, the wing or lever 124 extends rearwardly to a single point of contact with an upright adjusting screw 54 that may be advanced or retracted for the purpose of rocking or rotating the saddle or blade holder 121 about a pair of opposed centers 132 and 133 which are normally fixed relative to the frame of the machine. The centers mentioned may be in the form of pointed ends of a pair of studs or screws 55 and 56 each threadedly engaging a threaded bore 57 in the free ends of a pair of arms 58 and 59 that extend below the roll near the opposite ends thereof from an accessible position forwardly of the roll. Each arm may be furnished at its forward end with a bored boss or other suitable arm mounting means 60 whereby the arms may be supported by the frame or some stationary part of the machine. In the present illustration, the bored bosses of the arms receive a transverse brace bar 61 having opposite ends fixed relative to the frame sides. The characters 62 indicate keys or other suitable means to preclude accidental rotation of the arms 58 and 59 upon the brace bar 61. In constructions that employ a brace bar which is not cylindrical, it will be found convenient to alter the manner of fixedly mounting the arms 58 and 59.

Substantially midway between the supporting arms 58 and 59, there is provided a collar or adjusting screw support 64 which includes a bored and internally threaded extension 65 in which the adjustment screw 54 may be threadedly received and rotated to bear upon the wing or lever 124 of the saddle or blade support as indicated in Fig. 1. The collar or adjustment screw support may be fixed in adjusted positions in any suitable manner, such as by means of a set screw or the like 67. The construction just described furnishes a convenient and accessible adjustment for the scraper of the forward roll 10 of a sheeting means, retaining the three point suspension feature which is responsible for the various advantages stated in connection with the previously described scraper structure 21. As will be understood, the centers 132 and 133 embrace the saddle at a pivotal point close to the removable blade, so that successive adjustments result in keeping the keen edge of the scraper, rather than the heel thereof, in scraping relationship to the working face of the roll. To effect a bodily removal of the scraper structure, it is necessary only to back up one or both of the center screws 55 or 56, which will release the saddle and permit its removal forwardly of the roll. The supporting centers for the saddle are maintained in parallelism with the axis of roll 10 by means of the fixed arms 58 and 59, so that any blade inserted into the scraper supporting socket or channel thereof will necessarily contact the roll surface uniformly along its length. It will be observed that the structure just described possesses the advantages of the three point suspension feature and the rockable or pivotal saddle, including quick adjustability and replacement of scraper blades, although the blade is precluded from having free longitudinal shiftability.

Reverting to the structure disclosed at the right of Fig. 1, it may be noted that the bodily removal of the adjusting screw 34 together with its associated elements 38 and 50, results in freeing both of the scraper structures 21 and 22 for bodily removal and inspection without requiring the use of tools that would otherwise be necessary in the cramped quarters between the series of rolls. The invention contemplates the use of separate quick detachable bearing means such as 35 for separately clamping the ends of a divided adjusting screw 34 should it be desirable to render the scraper structures 21 and 22 entirely independent of one another. The groove 39 of the adjusting nut 38 is of such width as to enable reception of a bead or bearing 25 without binding and interfering with the tendency of the saddle to shift itself upon the fulcrum 17 as the blade and its supporting channel member 23 find a proper seating position between the roll flanges. As the scraper blade is constructed of very thin sheet steel, its inherent resiliency provides sufficient yielding pressure upon the roll surface to render unnecessary the use of springs in the adjusting means of the saddle.

As was stated previously, the edges 80—80 of the saddle are scraping edges which perform to remove adhering dough or plastic from the inner faces of the roll flanges at locations not within the reach of the ends of blade 27, (Fig. 5) that is, the scraper blade ends are not ordinarily of sufficient extent to scrape the flanges along the full depth of the latter, and under such circumstances, the edges 80—80 are depended upon to perform the scraping function from the flange peripheries inwardly toward, but not to, the working face of the roll. In this connection, it should be noted that the saddle may be provided with renewable scraper edges corresponding to the edges 80—80. This alteration is illustrated in the cross-sectional view of Fig. 6, which shows the fulcrum end of the Fig. 5 saddle equipped with a thin longitudinal face plate 83 of durable material, having its opposite ends adapted and located to assume the scraping function of edges 80—80. By providing for the use of a separate face plate 83, as disclosed in Fig. 6, the scraping edges thereof corresponding to edges 80—80 may be restored by merely attaching a new face plate. This is an advantage over the Fig. 5 construction, wherein the wearing away or corroding of the edges 80—80 necessitates furnishing a new saddle.

It should be noted that application of the face plate 83 to the part 23 does not interfere with the proper guiding of dough or plastic material toward the curling means as hereinbefore stated, and that said plate has a continuous upper feather edge 84 similar to that shown at 82 of Fig. 5. Any suitable means may be employed for detachably connecting the face plate to the scraper saddle along the length of the portion 23, there being shown by way of example a screw or screws 85 passing through the members 30 and 23 to engage threaded apertures such as 86.

The foregoing disclosure is illustrative of a typical application of the present invention to a sheeting machine of one known type only, and since different machines may vary considerably in their structural make-up, it must be expected that embodiment of the invention in the various types of machines requiring scrapers will necessitate certain changes for purposes of adaptation. It is to be understood, therefore, that various modifications and changes may be made in the structural details of the device of the invention, within the scope of the appended claims, without departing from the spirit of the invention.

What is claimed is:

1. In a scraper structure for rolls having end flanges and an intermediate working surface, the combination of a thin and narrow scraper blade having opposed longitudinal edges, one of said edges adapted for contacting at an acute angle the working surface of the roll in the direction of the roll axis, and opposite ends fitted between the roll flanges with slight clearance, and a rockable saddle including a narrow longitudinal seat in the plane of the blade for supporting said blade as a floating member capable of self-equalization of the clearance at opposite ends of the blade.

2. In a scraper structure for rolls having end flanges and an intermediate working surface, the combination of a scraper blade having a longitudinal edge for contacting the working surface of the roll, and opposite ends fitted between the roll flanges with slight clearance, and means for supporting said blade as a floating member capable of self-equalization of the clearance at opposite ends of the blade, said supporting means having two points of suspension near the blade and a third point of suspension remote from the blade, and means associated with the latter point of suspension for rocking the blade supporting means about the remaining two points of suspension.

3. In a scraper structure for rolls having end flanges and an intermediate working surface, the combination of a thin sheet-like blade having a longitudinal edge for contacting and scraping the working surface of the roll, said blade having opposite ends fitted between the roll flanges with slight clearance, a blade holder including a channel for reception of the blade and wherein the blade is free to shift longitudinally within the limits imposed by the spacing of the roll flanges, and means supporting the blade holder for shifting movement parallel to the axis of the roll and within the space between the roll flanges.

4. In a scraper structure for rolls having end flanges and an intermediate working surface, the combination of a thin sheet-like blade having a longitudinal edge for contacting and scraping the working surface of the roll, said blade having opposite ends fitted between the roll flanges with slight clearance, a blade holder including a channel for reception of the blade and wherein the blade is free to shift longitudinally within the limits imposed by the spacing of the roll flanges, means supporting the blade holder for shifting movement parallel to the axis of the roll and within the space between the roll flanges, and means for rocking the blade holder transversely to the line of shiftability without interfering with the shiftability thereof.

5. In a machine for rolling viscous substances, the combination of pressure means including a rotatable roll, a steady rest located in spaced parallelism to the axis of the roll, a saddle having a bearing portion to be supported for rocking movement upon the steady rest along a line parallel to the roll axis, a scraper blade on the saddle arranged to scrape the rotatable roll at one side of the roll axis, and means at the opposite side of the roll for rocking the saddle to positions of adjustment of the scraper blade relative to the roll.

6. In a machine for rolling viscous substances, the combination of pressure means including a rotatable roll, a steady rest located in spaced parallelism to the axis of the roll, a saddle having a bearing portion to be supported for rocking movement upon the steady rest along a line parallel to the roll axis, a scraper blade on the saddle arranged to scrape the rotatable roll at one side of the roll axis, a lever extension on the saddle spanning the width of the roll and extending to the side thereof opposite to that at which the scraper blade is located, and means for engaging the lever extension and for moving it to effect a rocking movement of the saddle upon the steady rest.

7. In a machine for rolling viscous substances, the combination of pressure means including a rotatable roll, a steady rest located in spaced parallelism to the axis of the roll, a saddle having a bearing portion to be supported for rocking movement upon the steady rest along a line parallel to the roll axis, a scraper blade on the saddle arranged to scrape the rotatable roll at one side of the roll axis, a lever extension on the saddle spanning the width of the roll and extending to the side thereof opposite to that at which the scraper blade is located, and means for engaging the lever extension at a single point of contact, and for moving it to effect a rocking movement of the saddle upon the steady rest.

8. In a machine for rolling viscous substances, the combination of a rotatable roll having a working surface bounded by opposed end flanges, a steady rest having a bearing edge located near the roll in substantial parallelism therewith, a saddle including a complementary bearing seat to rest upon and slide longitudinally along said bearing edge of the steady rest, the saddle extending between the roll flanges to thereby have its longitudinal sliding movement limited by the roll flanges, a scraper blade loosely mounted upon the saddle for free longitudinal shiftability while contacting the working surface of the roll, said shiftability being likewise limited by the roll flanges, and means adapted to rock the saddle upon the steady rest and at the same time leave the saddle and blade free to shift lengthwise as determined by the roll flanges.

9. In a machine for rolling viscous substances, the combination of a rotatable roll having a working surface bounded by opposed end flanges, a steady rest having a bearing edge located near the roll in substantial parallelism therewith, a saddle including a complementary bearing seat to rest upon and slide longitudinally along said bearing edge of the steady rest, the saddle extending between the roll flanges to thereby have its longitudinal sliding movement limited by the roll flanges, a scraper blade loosely mounted upon the saddle for free longitudinal shiftability while contacting the working surface of the roll, said shiftability being likewise limited by the roll flanges, means adapted to rock the saddle upon the steady rest and at the same time leave the saddle and blade free to shift lengthwise as determined by the roll flanges, and means for effecting quick bodily displacement of the saddle rocking means, to release the saddle for disassociation thereof from the steady rest.

10. As a new article of manufacture, a scraper assembly comprising a thin sheet metal scraper blade, and a saddle having a wide forward portion channeled to loosely receive said blade, the blade and the wide forward portion of the saddle being substantially coextensive in length, and the blade being freely shiftable in said channeled portion of the saddle, bearing means at the forward portion of the saddle near the blade, whereby the saddle may be rockably supported, and a rearwardly extended wing-like lever disposed at an angle to the plane of the blade, and including at its free end a bearing to be contacted for moving the saddle about its forward bearing means.

11. In a machine for rolling viscous substances, the combination of pressure means including a rotatable roll, a steady rest having a free edge adjacent to the roll, a saddle having a forward open groove portion to be supported for rocking movement upon the free edge of the steady rest in substantial parallelism with the roll axis, a scraper blade mounted on the saddle near said forward bearing portion to scrape the rotatable roll, and means for rocking the saddle to positions of adjustment of the scraper blade relative to the roll, the steady rest and bearing portion being so located relative to the roll as to guide the blade for adjustment along an arc of a circle that intersects the roll.

12. In a scraper structure for rolls having end flanges and an intermediate working surface, the combination of a narrow scraper blade having a longitudinal edge for contacting the working surface of the roll, and opposite ends fitted between the roll flanges with slight clearance to scrape part of the roll flanges, a saddle for supporting the blade as a floating member capable of self-equalization of the clearance at opposite ends of the blade, said saddle having ends likewise closely fitted between the flanges for scraping the flanges, and means for mounting the saddle for self-equalization of its clearance between the roll flanges.

13. In combination, a roll having a working surface and means supporting said roll for axial rotation, a scraper structure for the roll, said structure comprising a thin and narrow scraper blade having opposed longitudinal edges and opposed short ends, one of said longitudinal edges being adapted for contacting the working surface of the roll at an acute angle and along a line in substantial parallelism with the roll axis, a saddle support adjacent to the working surface of the roll, and a saddle fulcrumed upon the saddle support, said saddle including a blade seat supporting the blade with both longitudinal edges of the blade disposed at one side of the saddle fulcrum.

14. In combination, a roll having a working surface and means supporting said roll for axial rotation, a scraper structure for the roll, said structure comprising a thin and narrow scraper blade having opposed longitudinal edges and opposed short ends, one of said longitudinal edges being adapted for contacting the working surface of the roll at an acute angle and along a line in substantial parallelism with the roll axis, a saddle support adjacent to the working surface of the roll, and a saddle fulcrumed upon the saddle support, said saddle including a blade seat supporting the blade with both longitudinal edges of the blade disposed at one side of the saddle fulcrum, a lever extension on the saddle spanning the width of the roll and extending to the side thereof opposite to that at which the scraper blade is located, and means engaging the lever extension for rocking the saddle to adjusted positions about the fulcrum.

15. In combination, a roll having a working surface and means supporting said roll for axial rotation, a scraper structure for the roll, said structure comprising a thin and narrow scraper blade having opposed longitudinal edges and opposed short ends, one of said longitudinal edges being adapted for contacting the working surface of the roll at an acute angle and along a line in substantial parallelism with the roll axis, a saddle support adjacent to the working surface of the roll, and a saddle fulcrumed upon the saddle support, said saddle including a blade seat supporting the blade with both longitudinal edges of the blade disposed at one side of the saddle fulcrum, a lever extension on the saddle spanning the width of the roll and extending to the side thereof opposite to that at which the scraper blade is located, means engaging the lever extension for rocking the saddle to adjusted positions about the fulcrum, and means for instantaneous disconnection of the engaging means from the lever extension to expedite removal and replacement of the saddle relative to its support.

ADOLPH A. LIEBELT.